US008322773B2

(12) United States Patent
Parnaik et al.

(10) Patent No.: US 8,322,773 B2
(45) Date of Patent: Dec. 4, 2012

(54) RECLINER MECHANISM PACKAGE SHELF (75) Inventors: Yednesh A. Parnaik, Northville, MI (US); Keith R. Ziegler, Westland, MI (US); Michael C. Nazione, Howell, MI (US); Mihai Butas, Ypsilanti, MI (US); Kurt A. Seibold, Whitmore Lake, MI (US)

(73) Assignee: Johnson Controls Technology Company, Holland, MI (US)

( * ) Notice: Subject to any disclaimer, the term of this patent is extended or adjusted under 35 U.S.C. 154(b) by 681 days.

(21) Appl. No.: 12/516,749

(22) PCT Filed: Nov. 29, 2007

(86) PCT No.: PCT/US2007/085841
§ 371 (c)(1),
(2), (4) Date: Jun. 15, 2009

(87) PCT Pub. No.: WO2008/067424
PCT Pub. Date: Jun. 5, 2008

(65) Prior Publication Data
US 2009/0322113 A1 Dec. 31, 2009

Related U.S. Application Data (60) Provisional application No. 60/861,464, filed on Nov. 29, 2006.

(51) Int. Cl.
*B60R 7/04* (2006.01)
(52) U.S. Cl. .................................................. 296/37.16
(58) Field of Classification Search ................ 296/24.4, 296/24.44, 24.43, 24.46, 37.16, 66, 191, 296/193.01, 65.01; 410/104; 292/194, 195, 292/201, 216, 219; 297/378.12; B60R 5/04, B60R 7/04
See application file for complete search history.

(56) References Cited

U.S. PATENT DOCUMENTS

| 6,283,533 | B1 | 9/2001 | Gavin | |
| 6,702,355 | B1 * | 3/2004 | Price et al. | 296/37.16 |
| 7,080,867 | B2 * | 7/2006 | Woerner et al. | 296/37.16 |

(Continued)

FOREIGN PATENT DOCUMENTS

DE 19836919 C1 6/1999

(Continued)

OTHER PUBLICATIONS

Patent Cooperation Treaty (PCT), International Report on Patentability, PCT/US2007/085841, issued Jun. 3, 2009.

(Continued)

*Primary Examiner* — Glenn Dayoan
*Assistant Examiner* — Pinel Romain
(74) *Attorney, Agent, or Firm* — Butzel Long (57) ABSTRACT

A recliner mechanism (100) configured for selectively adjusting a seat back in a second row of a vehicle (10), such as a sedan, includes a close out device (200) in the form of an adjustable package shelf (210) of the vehicle (10) to cover a gap between the seat back (20) and the vehicle structure (11) as the seat back (20) is moved from the fully reclined position. This package shelf recliner mechanism (100) further includes a track system (110) mounted relative to the vehicle structure (11), a cross plate (130) coupled to the track system (110) and configured for translational movement relative thereto, a latch system (150) for releasably securing the cross plate (130) and an actuator, such as a handle or lever, for the user to selectively actuate the recliner mechanism (100).

12 Claims, 11 Drawing Sheets

U.S. PATENT DOCUMENTS

| | | | | |
|---|---|---|---|---|
| 7,396,063 B2 | * | 7/2008 | Warsi et al. | 296/24.44 |
| 7,731,461 B2 | * | 6/2010 | Stoeckl et al. | 410/104 |
| 2004/0245793 A1 | * | 12/2004 | Fischer | 296/24.4 |

FOREIGN PATENT DOCUMENTS

| | | | |
|---|---|---|---|
| EP | 1604863 A2 | | 12/2001 |
| JP | 2000177492 A | * | 6/2000 |
| JP | 2003306080 A | * | 10/2003 |

OTHER PUBLICATIONS

European Patent Office, Supplemental Extended European Search Report, EP06854815, Jun. 15, 2010.

* cited by examiner

RECLINER MECHANISM PACKAGE SHELF

CROSS-REFERENCE TO RELATED PATENT APPLICATIONS

This Application claims the benefit of U.S. Provisional Application No. 60/861464, entitled RECLINER MECHANISM, and filed Nov. 29, 2006, the content of which is incorporated herein by reference in its entirety.

BACKGROUND

The present disclosure relates generally to adjustable seats for use in vehicles. More particularly the present disclosure relates to a recliner mechanism for use in an adjustable seat in a vehicle.

It is generally known to provide adjustable vehicle seats. Further, it is generally known to provide an adjustable seat back of a vehicle seat in a first row seating application as well as in a single occupant vehicle seat such as a "captain's chairs" The angularly adjustable seat back allows an occupant to obtain a more comfortable seating position. It is also generally known to provide a non-first row and/or bench-type seat with an angularly adjustable seat back. Generally, recliner mechanisms are known for providing seat back angular adjustment. Such recliner mechanisms are generally known as pawl and latch-type and round heart-type recliner mechanisms.

Typically, such generally known recliner mechanisms are integral components of the vehicle seat and commonly interconnect the seat base and seat back. Alternatively, the recliner mechanism connects the seat back to the vehicle structure, commonly at the lower end of the seat back of the vehicle seat and using a bracket having one end connected to the recliner mechanism and the other end of the bracket connected to the vehicle structure. In another generally known embodiment, the seat back is latched to the vehicle structure using a high latch and a striker. There remains a continuing need to provide improved mechanisms for the above that provide greater performance than compared to the known systems.

SUMMARY

One exemplary embodiment of the present disclosure relates to a recliner mechanism package shelf configured for selectively controlling the angle of inclination of a seat back relative to a seat bottom. In the one exemplary embodiment, the recliner mechanism is configured to selectively adjust the seat back between a first or fully reclined position and a second or substantially upright position and includes a close out device for adjusting the package shelf of the vehicle to cover a gap between the seat back and the vehicle structure as the seat back is rotated from the fully reclined position.

In the one exemplary embodiment, the recliner mechanism includes a cross member configured to extend laterally from the seat back, a track system having inboard and outboard track arrangements for supporting movement of the cross member and for connecting the recliner mechanism to the vehicle structure, a latch system for selectively operating the recliner mechanism to achieve adjustment of the seat back of the vehicle seat, a first striker structure connected to the cross member for connecting the cross member to the seat back. In the one exemplary embodiment, the recliner mechanism further includes a laterally extending member extending from the cross member, the extending member including a second striker structure for connecting the recliner mechanism and the In the one exemplary embodiment the recliner mechanism may be configured to provide for any of a number of inclination ranges and in one embodiment, the angle of rotation between the fully reclined position and the substantially upright position is up to approximately 20 degrees and more particularly is up to 14 degrees and even more particularly is up to approximately 8 degrees.

In one embodiment, the rear side of the seat back is located adjacent to the vehicle body in the fully reclined position and the seat back is substantially proximate the vehicle body. In the one embodiment, the recliner mechanism is related to allow the seat back to be rotated away from the full reclined position toward the substantially upright position and the recliner mechanism includes a closeout device to prevent a gap between the upper end of the seat and the vehicle body from being created. According to one exemplary embodiment, the recliner mechanism includes a closeout device component including a plurality of telescoping panels to provide an expansion portion for concealing the gap between the seat back and vehicle structure. The closeout device is connected with the recliner mechanism and a latch member for releasing the recliner mechanism and the closeout device moves between a retracted position and an extended position coinciding with the fully reclined position and the substantially upright position of the seat back. In one embodiment, movement of the closeout device of the recliner mechanism follows a substantially linear path and in one alternative embodiment, a path that is at least partially arcuate.

In one exemplary embodiment, the seat recliner is configured to be used with a seat back having an inboard side bolster and an outboard side bolster and at least the outboard side bolster is configured for movement independent of a central portion of the seat back when the seat back is moved to a stowed position.

According to an exemplary embodiment, the recliner mechanism package shelf includes cross plate and an upper platform of the cross plate is a substantially flat member that spans continuously in a lateral direction between the outboard track arrangement and the inboard track arrangement. Provided proximate the outboard side of the upper platform are a series of apertures (e.g., latch windows, openings, holes, slots, etc.) that are spaced along (e.g., uniformly spaced, etc.) a portion the upper platform in the fore and aft direction of the vehicle. These apertures are configured to align with the apertures of the outboard track arrangement, to receive a portion of the latch assembly, and to thereby retain the cross plate in a position relative to the track system and the vehicle. Similar to the apertures provided in the outboard track arrangement, the shape, size, spacing and other characteristics of the apertures in the upper platform may vary, depending at least in part on the type of latch system that is used with the recliner mechanism. As illustrated, the apertures in the upper platform are generally vertically aligned, rectangular openings that are relatively closely spaced (e.g., spaced to allow for adjust of the angle of inclination of the seat back in 2 degree increments, etc.).

BRIEF DESCRIPTION OF THE DRAWINGS

The foregoing and other features of the exemplary embodiments will become more apparent to one skilled in the art upon consideration of the following detailed description and the accompanying drawings in which.

DETAILED DESCRIPTION

Referring to generally to FIGS. 1 through 20, recliner mechanisms for use in a vehicle seat for use in a vehicle are shown according to exemplary embodiments. The recliner mechanism 100 is configured for selectively controlling the angle of inclination of a seat back 20 relative to a seat bottom 30. According to the embodiments illustrated, the recliner mechanism 100 controls the angle of inclination of the seat back 20 relative to the seat bottom 30 for a seat 15 of a vehicle 10. The recliner mechanism 100 and methods described herein may be used in a variety of vehicle seat systems (e.g., front seats, second or third row seats, bucket seats, bench seats, etc.) for automobiles, trucks, vans, SUVS, trains, airplanes, boats, etc. and other non-vehicle seat applications wherein it would be desirable to use recliner mechanisms of type disclosed herein to control the angle of inclination of a seat back (e.g., theatre seats, dentist chairs, etc.).

Figure 7:
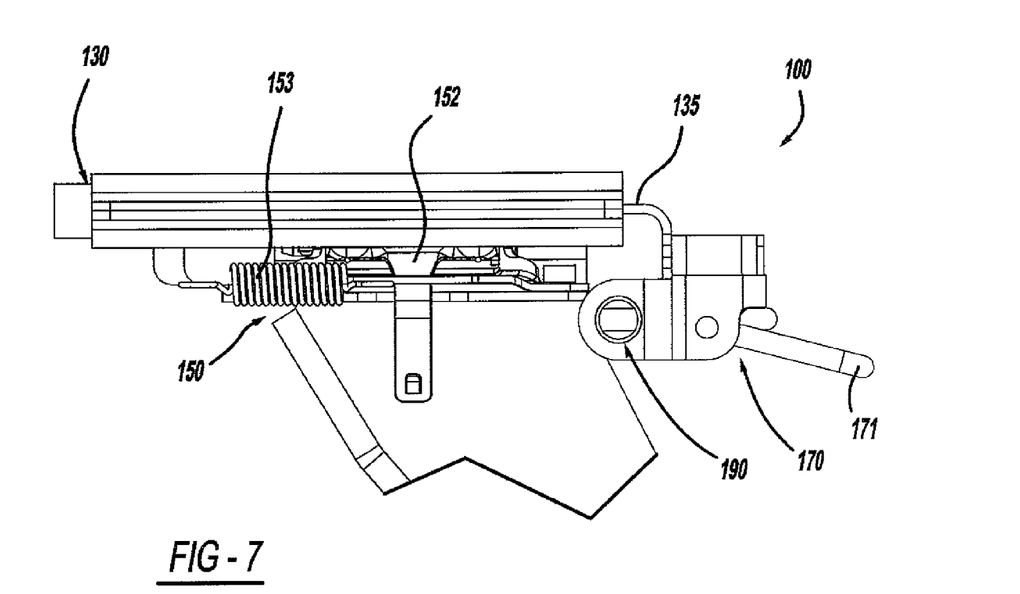
FIG. 7 is another side elevation view of the vehicle seat recliner mechanism of FIG. 1 taken from the inboard side of the recliner mechanism.
Figure 8:
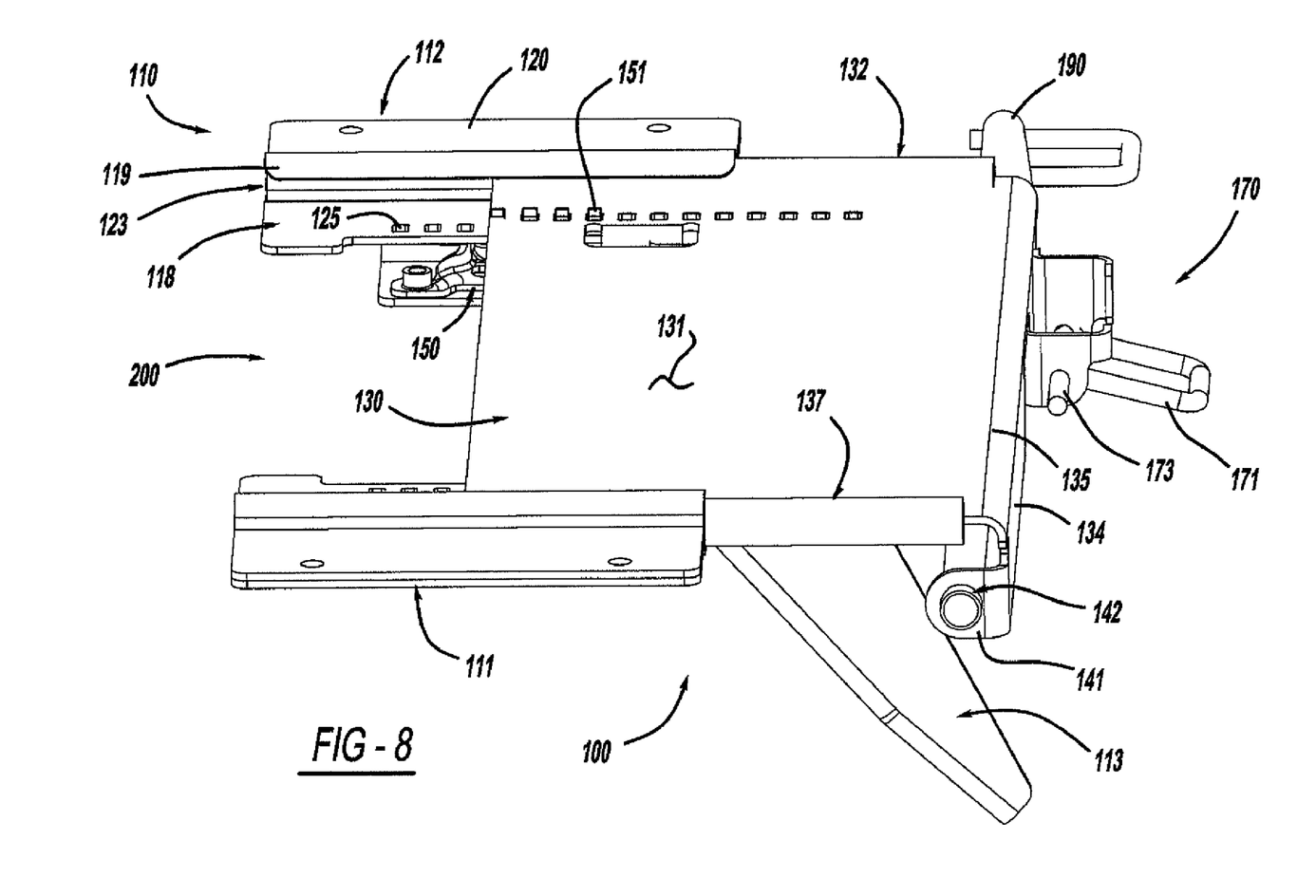
FIG. 8 is an isometric view of the vehicle seat recliner mechanism of FIG. 1 shown in an extended position.
Figure 9:
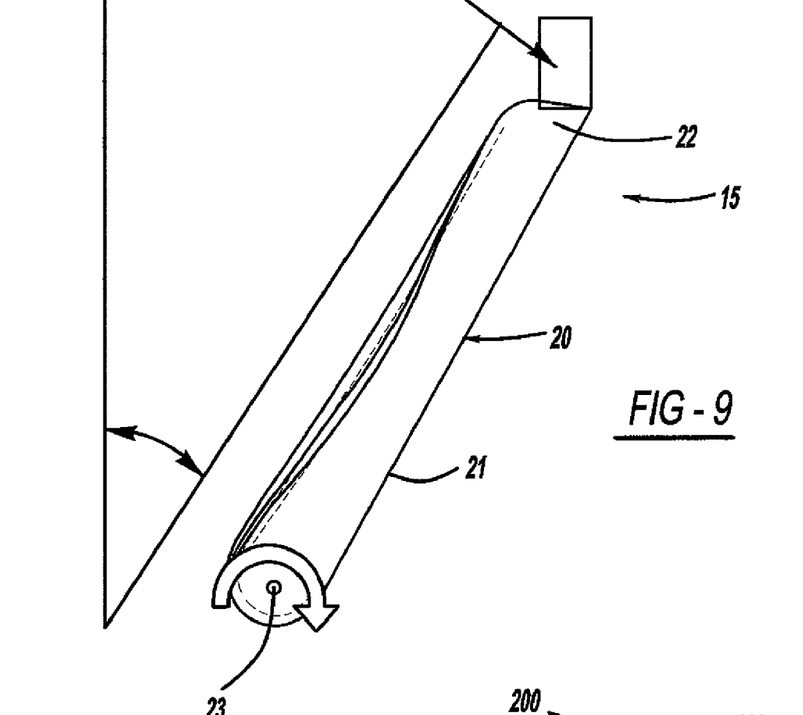
FIG. 9 is schematic side elevation view of a seat back portion of a vehicle seat according to an exemplary embodiment.
Figure 10:
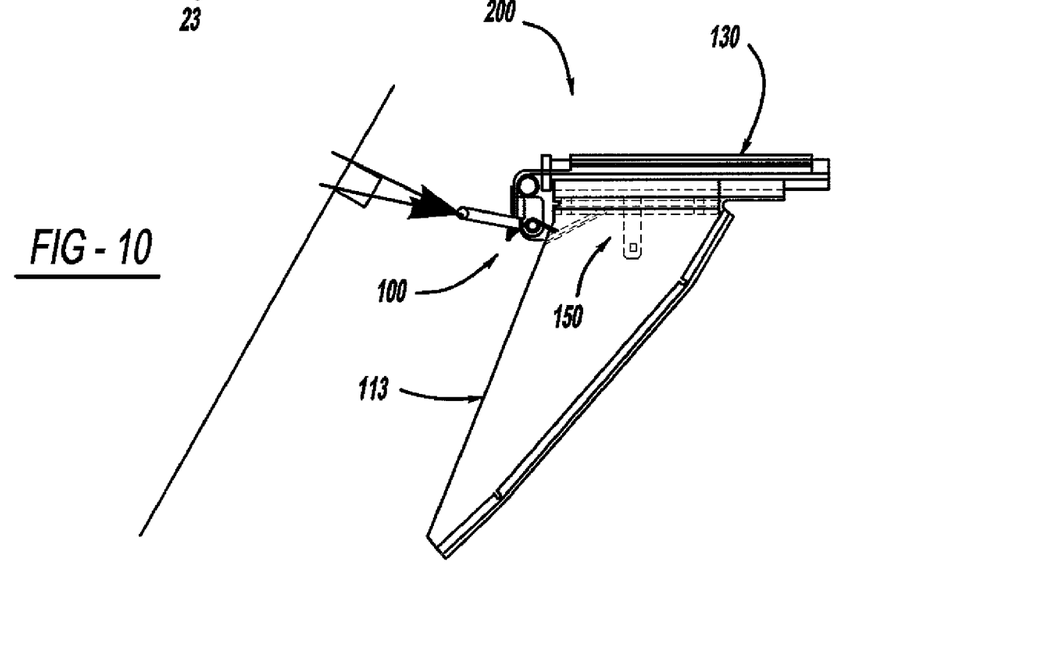
FIG. 10 is a side elevation view of the vehicle seat recliner mechanism of FIG. 1 taken from an outboard side of the recliner mechanism.

Referring now in particular to FIGS. 1 through 4, the recliner mechanism 100 is configured to selectively move (e.g., rotate, translate, etc.) the seat back 20 between a first position, referred to generally herein as a fully reclined position (as first shown in FIG. 7), and a second position, referred to herein as a substantially upright or design position (as best shown in FIG. 8). It should be noted that the recliner mechanism 100 is also configured to support the seat back 20 at the various positions (e.g., increments, etc.) between the fully reclined position (FIG. 7) and the substantially upright position (FIG. 8).

According to an exemplary embodiment, the angle of rotation between the fully reclined position (FIG. 7) and the upright position (FIG. 8) is relative to the seat bottom approximately 8 degrees. For example, in the fully reclined position, the seat back 20 may have an angle of inclination of approximately 77 degrees from horizontal, while in the substantially upright position, the seat back 20 may have an angle of inclination of approximately 85 degrees from horizontal. According to the various alternative embodiments, the recliner mechanism 100 may be configured to rotate the seat back various angles of inclinations as may be desired for a given application.

In one exemplary embodiment, the rear side 21 of the seat back 20 will be received by or be otherwise adjacent to the vehicle body or structure 11. For example, in the fully reclined position, the seat back 20 may be substantially proximate the vehicle body 11. In such an application, when the recliner mechanism 100 rotates the seat back 20 away from the fully reclined position toward the substantially upright position, a space or gap will be formed between an upper end 32 of the seat back 20 and the vehicle body 11.

To conceal such a gap, the recliner mechanism 100 advantageously functions as a closeout device 200. As detailed below, according to one exemplary embodiment, the recliner mechanism 100 includes an expansion component 210 (e.g., a shelf coupled to a cross plate, such as a package shelf for a sedan or other type of vehicle.) in the form of a plurality of telescoping panels 220 that may be utilized to provide an expansion portion for concealing the gap. Similar to the seat back 20, the closeout device 200 moves between a retracted position (FIG. 7) and an extended position (FIG. 8) coinciding, respectively, with the fully reclined position (FIG. 7) and the substantially upright position FIG. 8) of the seat back 20.

Movement of the closeout device 200 of the recliner mechanism 100 may be in a path that is substantially linear (e.g., parallel (not shown) to the vehicle floor, as shown in the FIGURES), or alternatively, may be in a path that is at least partially arcuate (not shown). The path of movement for the closeout device 200 of the recliner mechanism 100 may be at least partially dependent on the configuration of the recliner mechanism 100.

Figure 1:
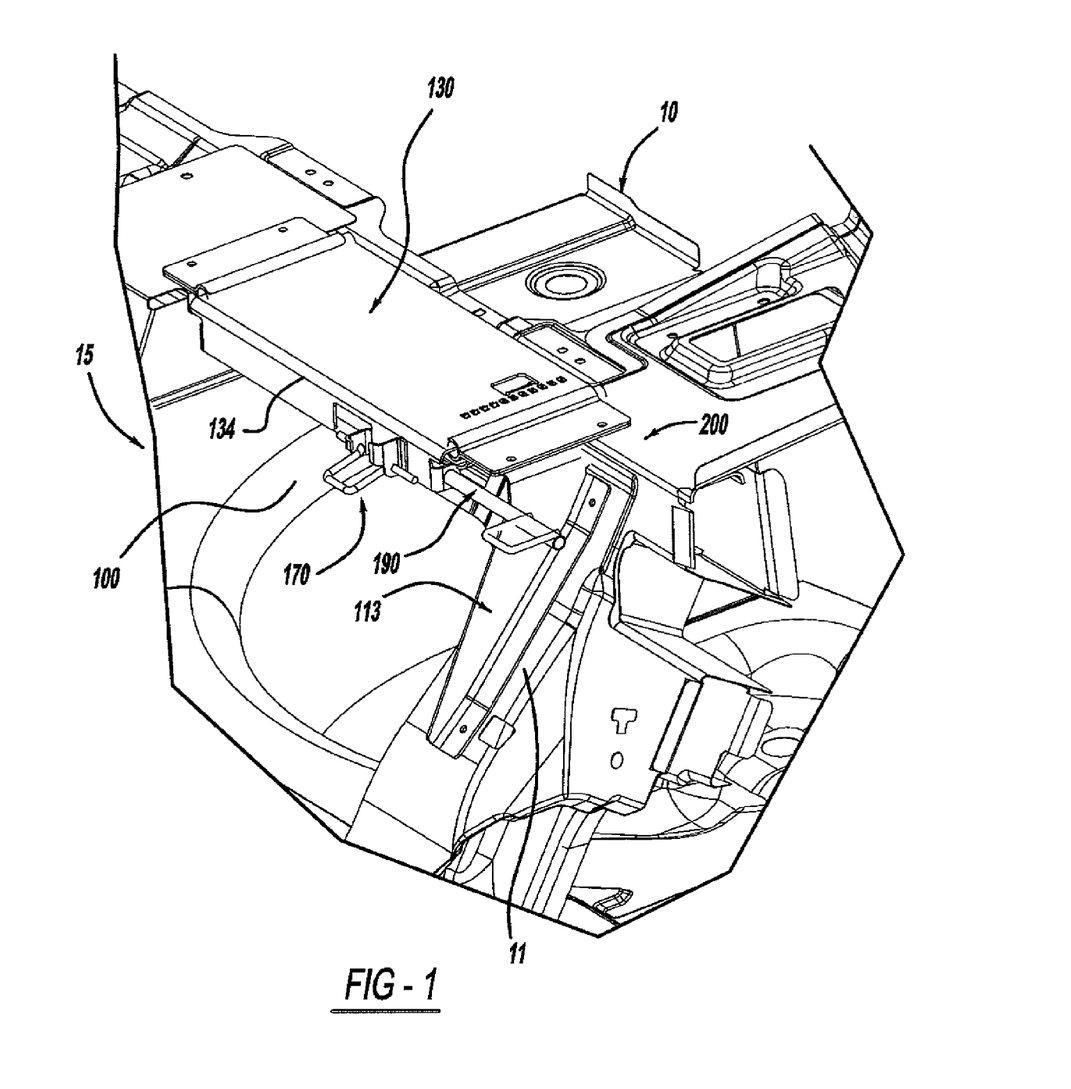
FIG. 1 is an isometric view of a vehicle seat recliner mechanism according to an exemplary embodiment mounted to a vehicle body.

Referring to FIG. 1 in particular, the vehicle seat recliner mechanism 100 is shown according to an exemplary embodiment. To rotate a seat back 20 to a desired angle of inclination, the recliner mechanism 100 is configured to move in a generally linear direction. The recliner mechanism 100 moves in a linear and translational manner which causes the rotational movement of the seat back 200 relative to the vehicle 10 and/or seat bottom 30. For example, when applied to a forward facing rear vehicle seat 15, movement of the recliner mechanism 100 in a fore and aft (i.e., forward or car longitudinal) direction of the vehicle will cause the angle of the seat back 30 to rotate at the pivot 23 between the fully recliner position and the substantially upright position.

Referring still to FIG. 1, the recliner mechanism 100 generally includes a track system 110 mounted relative to the vehicle body 11, a cross plate 130 coupled to the track system 110 and configured for translational movement relative thereto, a latch system 150 for releasably securing the cross plate 130 to the track system 110, closeout device 200 for concealing the gap between the vehicle body 11 and the seat back 20, and a user or operating interface (e.g., handle, lever, etc.), not shown, for allowing the user to selectively actuate (disengage) the recliner mechanism 100. Actuation of the recliner mechanism 100 adjusts the angle of inclination of the seat back 20 and allows the seat back 20 to be moved between the fully reclined position and the substantially upright position.

The recliner mechanism 100 is configured to be positioned behind seat back 20 and proximate the upper end 22 of the seat back 20. The seat 15 includes one or more connectors (shown as a first striker 16 and a second striker 17) for engaging portions of the seat back 20 proximate its upper end 22. According to an exemplary embodiment, one or more of the connectors is configured to releasably engage the seat back 20 so a user may selectively move the seat 15 to a stowed position (e.g., fold-flat, collapsible, etc.) and/or optionally remove the vehicle seat 15 from the vehicle 10 entirely.

The seat recliner 100 is configured to be used with a seat back 20 having a central portion (i.e., configured to support the back of a seat occupant) disposed between an inboard side bolster and an outboard side bolster, with the inboard side bolster having a side surface facing an inboard side of the vehicle and the outboard side bolster having a side surface facing an outboard side of the vehicle. At least the outboard side bolster is configured for movement independent of the central portion of the seat back. Such a configuration allows the outboard side bolster to remain in a use or upright position while the remaining portions of the seat back 20 are moved to the stowed position and/or removed from the vehicle entirely.

Referring now to FIGS. 1 through 4 and 8, the track system 110 is shown according to one exemplary embodiment. The track system 110 generally includes an inboard track arrangement 111 and an outboard track arrangement 112. The inboard track arrangement 111 and the outboard track 112 arrangement are shown as being mounted to the vehicle body 11 in a generally spaced-apart and parallel relationship, with the inboard track arrangement 111 being located proximate an inboard side of the seat back 20 and the outboard track arrangement 112 being located proximate an outboard side of the seat back 20. The inboard track arrangement 111 and the outboard track arrangement 112 are shown as extending in the fore-aft direction of the vehicle.

The inboard track arrangement 111 is shown as being mounted directly to the vehicle body 11, while the outboard track arrangement 112 is shown as being mounted indirectly to the vehicle body 11. To facilitate the indirect mounting of the outboard track arrangement 112 to the vehicle body 11, a support member (e.g., structural component, frame member, etc.), shown as a mounting bracket 113, is provided. The mounting bracket 113 includes a first mounting flange 114 configured to be mounted directly to the vehicle body 11 and a second mounting flange 115 configured to be mounted directly to the outboard track arrangement 112. The mounting bracket 113 further includes a third mounting flange 116 configured to support the latch system 150, as detailed below and shown in FIG. 6.

The inboard track arrangement 111 is generally identical to the outboard track arrangement 112, except that inboard track arrangement 111 is a mirror image of outboard track arrangement 112. For simplicity, only the outboard track arrangement 112 will be described below, it being understood that the description applies equally to the inboard track arrangement 111 unless otherwise provided herein. The outboard track arrangement 112 includes a first or lower track member 118 and a second or upper track member 119.

The lower track member 118 (e.g., rail, guide, etc.) and the upper track member 119 are elongated and generally rigid members which cooperate with each other to provide a guide for the cross plate 130. According to an exemplary embodiment, the track members 118 and 119 are formed of steel (e.g., SAE J2340 340 XF), but alternatively, may be formed of any other suitable material. According to one exemplary embodiment, the lower track member 118 and the upper track member 119 each include a mounting portion 120, shown as a substantially flat flange, and a guide portion 121 having a contour 122 that at least partially defines a channel. The upper track member 119 is configured to be mounted on the lower track member 118 so that the two guide portions 121 align and define a channel 123 for receiving the cross plate 130. According to the embodiment illustrated, the two guide portions 121 cooperate to define a substantially C-shaped channel 123. According to various exemplary embodiments, the guide portion 121 for the cross plate 130 may have any of a number of suitable cross sections (e.g., rectangular, triangular, non-uniform, etc.).

In addition to mounting to each other, the two flanges 120 of the lower track and upper track members 118 and 119 respectively, are configured to be fixedly mounted to the second flange 115 of the mounting bracket 113. Such mounting may be achieved using one or more mechanical fasteners (e.g., bolts, rivets, clips, etc.), a suitable welding technique (e.g., laser welding, spot welding, etc.), and/or any other suitable technique for fixedly mounting two generally rigid members together.

Figure 6:
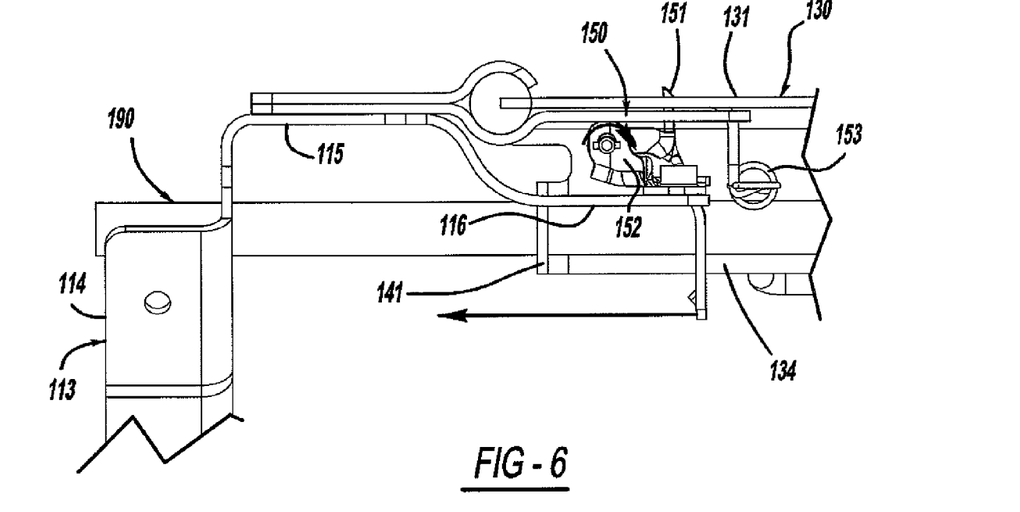
FIG. 6 is a partial detail rear elevation view of the vehicle seat recliner mechanism of FIG. 1.

The lower track member 118 further includes an extension portion 124 (on the side opposite the flange) that is configured to receive a portion of the latch system 150. The extension portion 124, as shown in FIG. 6, is offset and substantially parallel with the third flange 116 of the mounting bracket (i.e., the portion supporting the latch system 150). As shown in FIG. 8, the extension portion 124 includes a series of apertures 125 (e.g., latch windows, openings, holes, slots, etc.) that are spaced along (e.g., uniformly spaced, etc.) a portion of the extension portion 124 in the fore-aft direction of the vehicle. These apertures 125 are configured to receive a portion of the latch assembly 150 and to thereby retain the cross plate 130 in a position relative to the track system 110 and the vehicle 10. The shape, size, spacing and other characteristics of the apertures 125 may vary, depending at least in part on the type of latch assembly 150 that is used with the recliner mechanism 100. As illustrated, the apertures 124 are generally a plurality of aligned, rectangular openings that are relatively closely spaced (e.g., spaced to allow for adjust of the angle of inclination of the seat back in 2 degree increments, etc.).

The lower track member 118 of the inboard track 111 arrangement may alternatively include an extension portion 124. For example, if the latch system 150 is only provided at the outboard track arrangement 112, it may not be necessary for the inboard track arrangement 111 to include this structure. According to the various alternative embodiments, a second latch assembly 150 may be provided at the inboard track arrangement 111 and therefore the lower track member 118 may include such an extension member 124.

Figure 2:
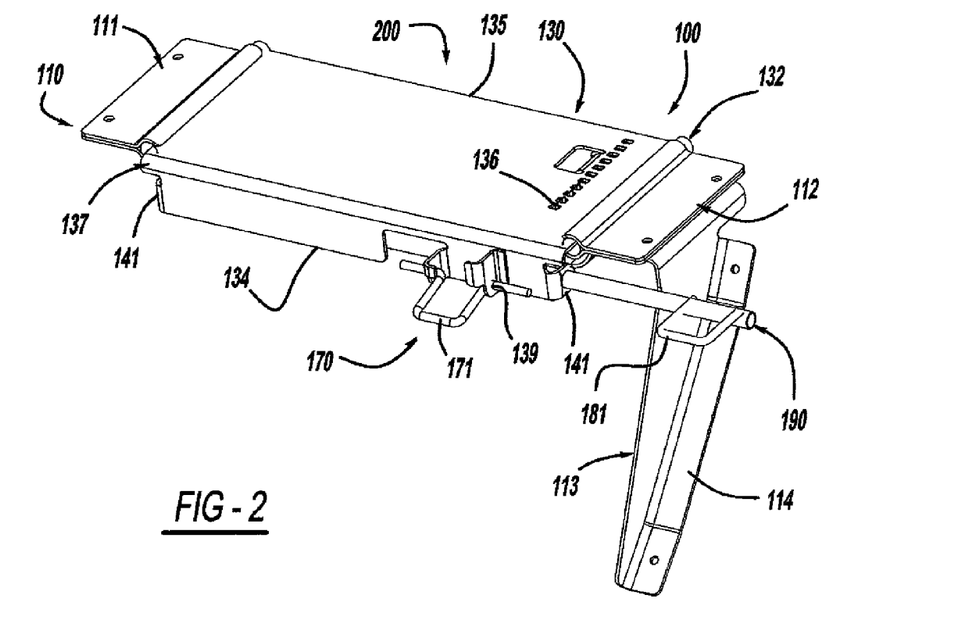
FIG. 2 is an isometric view of the vehicle seat recliner mechanism of FIG. 1.
Figure 3:
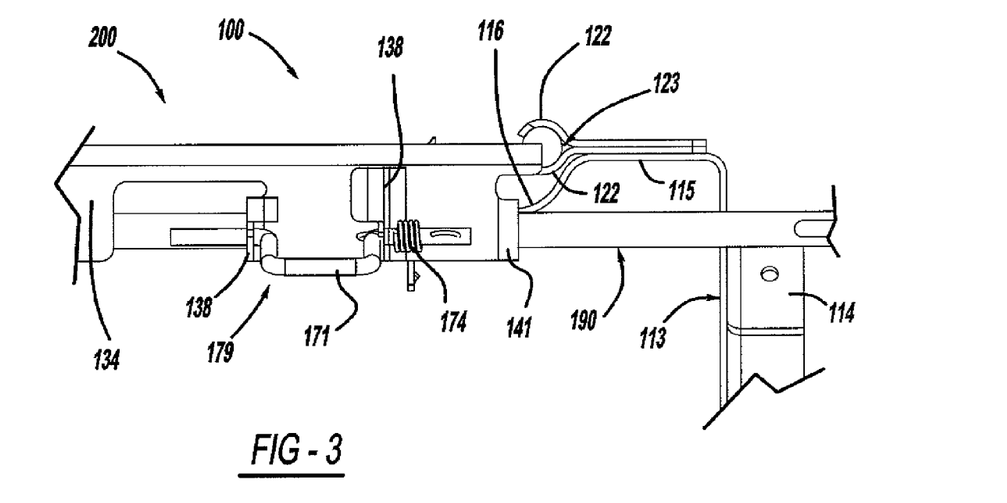
FIG. 3 is a front elevation view of the vehicle seat recliner mechanism of FIG. 1.
Figure 4:
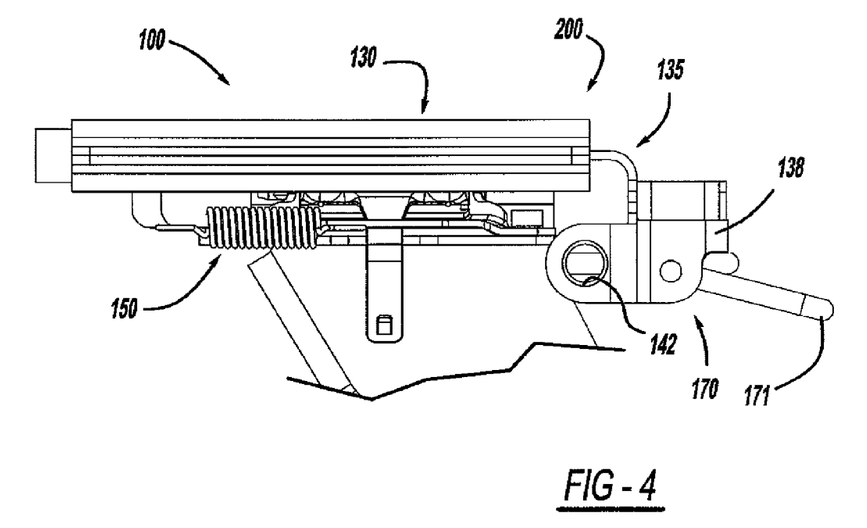
FIG. 4 is a side elevation view of the vehicle seat recliner mechanism of FIG. 1 taken from an inboard side of the recliner mechanism.
Figure 5:
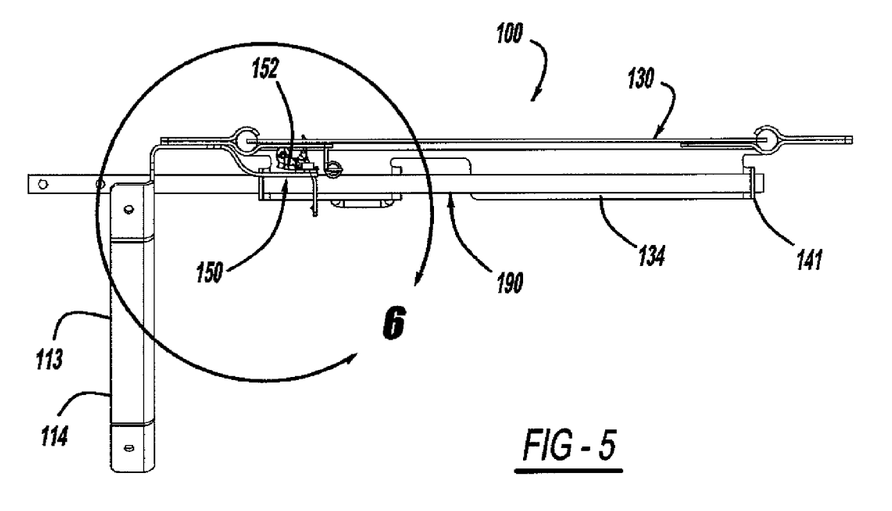
FIG. 5 rear elevation view of the vehicle seat recliner mechanism of FIG. 1.

Referring to FIGS. 1 and 2 in particular, the cross plate 130 is shown according to one exemplary embodiment. Upon actuation of the latch system 150, the cross plate 130 is configured to move along a substantially linear path (e.g., in the fore and aft direction of the vehicle, etc.) relative and according to the track system 110. The cross plate 130 is coupled between the seat back 20 and the track system 110 in such a manner that linear movement of the cross plate 130 relative to the track system 110 will rotate the seat back 20 between the fully reclined position and the substantially upright position. The cross plate 130 is also configured to support to the closeout device 200 (e.g., a telescoping shelf structure, etc.) for concealing the gap created when the seat back 20 moves from the fully reclined position and the substantially upright position. The cross plate 130 is shown as a generally rigid member having a upper surface or platform 131, an outboard track engaging portion 132, an inboard track engaging portion 133, and a flange 134 depending downwardly from a front edge 135 of the upper surface 131.

According to an exemplary embodiment, the upper platform 131 of the cross plate 130 is a substantially flat member that preferably spans continuously in a lateral direction between the outboard track arrangement 112 and the inboard track arrangement 111. Provided proximate the outboard side 132 of the upper platform 131 are a series of apertures 136 (e.g., latch windows, openings, holes, slots, etc.) that are spaced along (e.g., uniformly spaced, etc.) a portion the upper platform 131 in the fore and aft direction of the vehicle 10. These apertures 136 are configured to align with the apertures 136 of the outboard track arrangement 112, to receive a portion of the latch assembly 150, and to thereby retain the cross plate 130 in a position relative to the track system 110 and the vehicle body 11. Similar to the apertures 125 provided in the outboard track arrangement 112, the shape, size, spacing and other characteristics of the apertures 136 in the upper platform 131 may vary, depending at least in part on the type of latch system 150 that is used with the recliner mechanism 100. As illustrated, the apertures 136 in the upper platform 130 are generally vertically aligned, rectangular openings that are relatively closely spaced (e.g., spaced to allow for adjust of the angle of inclination of the seat back 20 preferably in 2 degree increments, etc.).

Provided at the outboard and inboard lateral sides of the upper platform 131 are the outboard track engaging portion 132 and the inboard track engaging portion 137 respectively. The inboard track engaging portion 137 is generally identical to the outboard track engaging portion 132, except that inboard track engaging portion 137 is a mirror image of outboard track engaging portion 132. For simplicity, only the outboard track engaging portion 132 will be described below, it being understood that the description applies equally to the inboard track engaging portion 137 unless otherwise expressly provided herein.

Referring to FIG. 6, the outboard track engaging portion 132 is received by the guide channel 123 defined by the outboard track arrangement 112 and configured for reciprocating linear movement therein. According to an exemplary embodiment, the outboard track engaging portion 132 has a cross section corresponding to the cross section of the guide channel 123 and is configured for sliding movement therein. As such, for the exemplary embodiment illustrated, the cross section of the outboard track engaging portion 132 is substantially round and is preferably circular.

According to the embodiment illustrated, the outboard track engaging portion 132 of the cross plate 130 is formed of a different material than the upper platform. Such an embodiment allows the outboard track engaging portion 132 to be formed of a material that reduces the friction between the cross plate 130 and the track system 110 when the cross plate 130 slides relative thereto (i.e., function as a bearing surface), while allowing the cross plate 130 to be formed of a more rigid material. According to an exemplary embodiment, the cross plate 130 is preferably formed of steel (e.g., SAE J2340 340 XF), while the outboard track engaging portion 132 is formed of a plastic material. According to the various exemplary embodiments, the upper platform 131 and the outboard track engaging portion 132 may be formed of any of a number of suitable materials, may be formed of the same materials, or may be unitarity formed as a single, one-piece member.

According to an exemplary embodiment, the outboard track engaging portion 132 of the cross plate 130 is coupled to the upper platform 131 by being insert molded with the upper platform 131. According to the various exemplary embodiments, the outboard track engaging portion 132 may be coupled to the upper platform 131 using any suitable fastening technique including, but not limited to, mechanical fasteners, welding, etc.

Provided along the front edge of the cross plate 130 is the flange 134. This flange 134, which is shown as depending downwardly from the front edge 135 of the upper surface 131, is provided to support a structure 170 for engaging the seat back 20 to the recliner mechanism 100. According to the embodiment illustrated, two arms 138 are cutout of the flange 134 and bent outward in a forward direction. Each arm 138 defines an aperture 139 configured to receive a connector, shown as a first striker 171. The first striker 171 is in the form of a shaped circular rod and is configured to be engaged by a corresponding latch arm or latch 172 provide on the rear side 21 of the seat back 20. Engagement between the first striker 171 and the latch arm 172 on the seat back 20 allows the seat back 20 to move with the cross plate 130 as the cross plate 130 moves relative to the track system 110 and the vehicle body 11. According to an exemplary embodiment, the latch arm 172 provided on the rear side 21 of the seat back 20 is configured to be releasably coupled to the first striker 171 so that a user may selectively move the seat 15 to a stowed position (e.g., by collapsing the seat back relative the recliner mechanism, etc.) while the recliner mechanism 100 remains fixed to the vehicle body 11, but alternatively may be permanently coupled to the first striker 171.

To take up the radial travel of the seat back 20 relative to the linear travel of the cross plate 130 as the seat back 20 moves from the fully reclined position to the substantially upright position, the first striker 171 is rotatably supported at the flange 134 and configured to rotate about a pivot axis 173 that is substantially parallel with the seat back 30. According to the embodiment illustrated, this is accomplished by sizing the apertures 139 in the arms 138 of the flange 134 to be slightly larger than the rod of the first striker 171. It is generally desirable to have the first striker 171 extend outward from the structure 170 to which it is supported, rather than simply hang down, so that latch arm 172 on the seat back may easily locate the striker 171 when returning the vehicle seat 15 from a stowed position to a use position. To facilitate the desired positioning of the first striker 171, a biasing element (e.g., spring, carn, etc.), shown as a torsion spring 174, is provided (shown in FIG. 3). According to the embodiment illustrated, the torsion spring 174 is coupled between the first striker 171 and the flange 134 of the cross plate 130 to urge the first striker 171 outward relative thereto.

Referring further to FIG. 2, the flange 134 of the cross plate 130 is further provided to support a second structure 180, shown as a second striker 181, for engaging a outboard side bolster of the seat back 20 to the recliner mechanism 100. According to the embodiment illustrated, two arms 141 are cutout of the flange 134 at opposite lateral sides and bent laterally in a rearward direction. Each arm 141 defines an aperture 142 configured to receive a cross tube 190. The cross tube 190 extends laterally across the entire width of the cross plate 130 and is fixedly coupled thereto. According to an exemplary embodiment, the cross tube 190 is welded to the flange 134 of the cross plate 130. According to the various exemplary embodiments, the cross tube 190 may be fixed relative to the cross plate 130 using any other suitable technique (e.g., mechanical fasteners, etc.).

At the outboard side of the vehicle 10, the cross tube 190 extends beyond the lateral boundary of the cross plate 130 and has supported proximate its free end 191, the second striker 181. The second striker 181 is fixed relative to the cross tube 190. Like the first striker 171, the second striker 181 is in the form of a shaped circular rod. The second striker 181 is configured to be engaged by a corresponding latch arm provide on a back side 21 of the outboard side bolster of the seat back 20. Engagement between the second striker 181 and the latch arm on the outboard side bolster allows the side bolster to move with the cross plate 130 (and the seat back 20) as the cross plate 130 moves relative to the track system 110 and the vehicle body 10. However, such engagement also allows the seat back 20 to move independent of the outer side bolster when the seat back 20 is moved to the stowed position. This advantageously allows the outboard side bolster to remain in a use position when the seat back is stowed. To take up the radial travel of the side bolster relative to the linear travel of the cross plate, the latch arm on the side bolster is rotatably coupled to the second striker 181.

Referring to FIGS. 6 and 7, the latch system 150 is shown according to an exemplary embodiment. The latch system 150 is a locking mechanism or assembly that is intended to cooperate with the latching-related apertures in the track system 110 and the cross plate 130 to releasably retain the cross plate 130 in a fixed position relative the track system 110. The latch system 130 may take any of a variety of suitable forms suitable for releasably retaining the cross plate 130 relative to the track system 110, and is not limited to the exemplary embodiment illustrated in the drawings. Actuation of the latch system 150 may be mechanical, electrical or a combination thereof According to the embodiment illustrated, actuation is mechanical and caused when a user actuates a handle or lever, which in turn pulls on a cable connected to the latch system 150.

Figure 11:
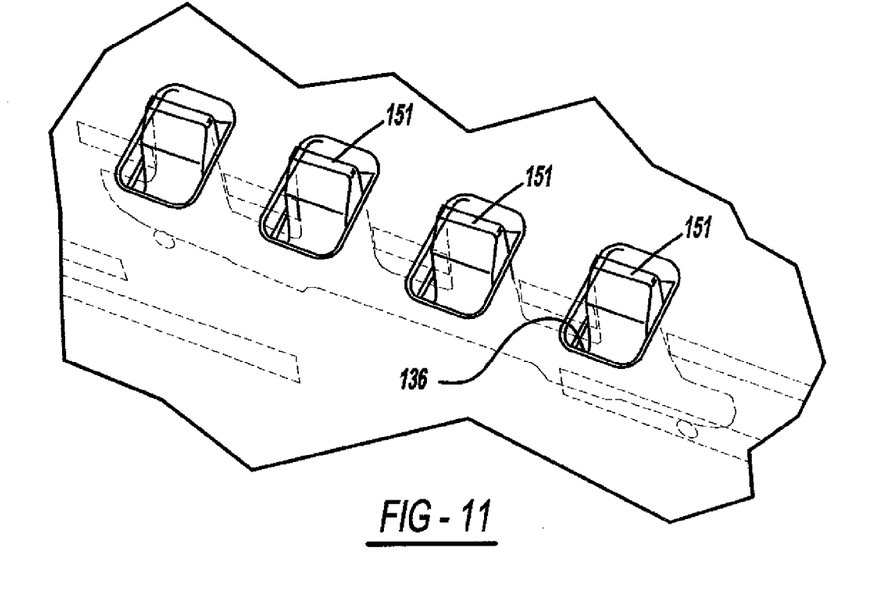
FIG. 11 a partial detail isometric view of the vehicle seat recliner mechanism of FIG. 1 showing a pawl engaging a pair of plates.
Figure 12:
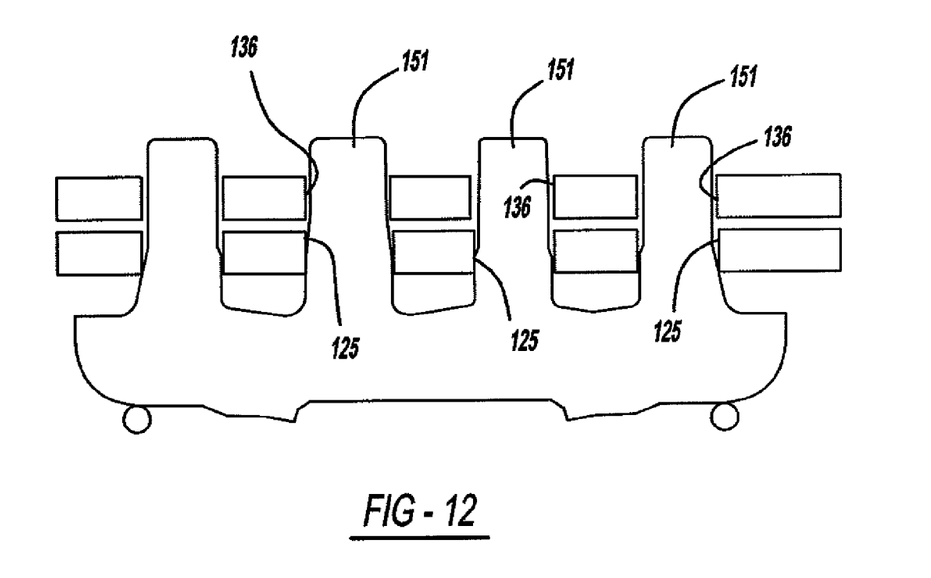
FIG. 12 is a cross section view of the pawl engaging the plates taken along a line 12-12 in FIG. 11.

According to the embodiment illustrated, the latch system 150 includes at least one finger tooth or projection 151 (e.g., pin, bar, beam, key, etc.) that is configured to extend through the aperture 125 in the track system 110 and a corresponding aperture 136 in the cross plate 130 (shown in FIGS. 11 and 12). By extending through the aperture 125 in the track system 110, which is stationary, the tooth 151 locks in place, with respect to translation 20, movement of the cross plate 130 (and thereby movement of the seat back 20). To release the cross plate 130 and allow it to move to translate relative to the track system 110, the tooth 151 is retracted until it no longer extends through the aperture 136 in the cross plate 130. In addition to the tooth 151, the latch system 150 includes various structures (e.g., a series of springs, levers, cams, hinges, solenoids, braces, plates, assemblies, supports, and/or pivots, etc.) that cooperate with each other to allow a user to at least partially control the insertion and retraction of the lock tooth 151 into one or more of the apertures 136 in the cross plate 130 to adjust the angle of the seat back 20.

According to an exemplary embodiment, the latch system 150 includes a pawl member 152 and a biasing element, shown as a spring 153. The pawl 152 is rotatably supported relative to the mounting bracket 113 about a pivot pin and is operably coupled to the fingers or pins. The pawl 152 is biased by the spring 153 to a position wherein the teeth 151 extend upward in an effort to engage the apertures 136 in the cross plate 130. Rotation of the pawl 152 (caused by a pulling of the cable as represented by the arrow in FIG. 6) causes the teeth 151 to retract from the apertures 136 of the cross plate 130, thereby allowing a user to adjust the angle of the seat back 20.

Referring to FIGS. 15 through 18, the closeout device 200 is shown according to an exemplary embodiment. The closeout device 200 is configured to conceal the gap created between the vehicle body 11 and the upper region 22 of the seat back 20 when the seat back 20 rotates from the fully reclined position to the substantially upright position. According to an exemplary embodiment, the closeout device 200 is in the form of a shelf system 202 supported between the cross plate 130 and vehicle body 11.

According to the embodiment illustrated, the shelf system 202 generally includes a first or bottom shelf member 207 and a second or top shelf member 205. At least one of the bottom shelf member 207 and the top shelf member 205 are telescoping members which can move between a retracted position (shown in FIGS. 15 and 16) and an extended position (shown in FIGS. 17 and 18) coinciding with the fully reclined position and the substantially upright position of the seat back 20.

According to the embodiment illustrated, the bottom shelf 207 is supported at the cross plate 130 and is configured to move relative to the top shelf 205 which is relatively fixed (e.g., by being mounted to the vehicle body and/or a fixed component of the recliner mechanism, etc.). As the cross plate 130 moves forward, thereby rotating the seat back 20 away from the vehicle body 11, the bottom shelf 207 slides forward with the cross plate 170 (relative to the top shelf 205) to provide a relatively clean closeout of the gap 206 created.

The top shelf 205 and the bottom shelf 207 are shown as substantially rectangular members having top and bottom surfaces that are relatively flat. According to various alternative embodiments, the shapes these members and their outer surfaces may be varied to accommodate various trim requirements for the vehicle seat 15 and/or may be reversed. For example, these members may be configured to telescope relative to each other in an arc-shaped manner.

Figures 13, 14:
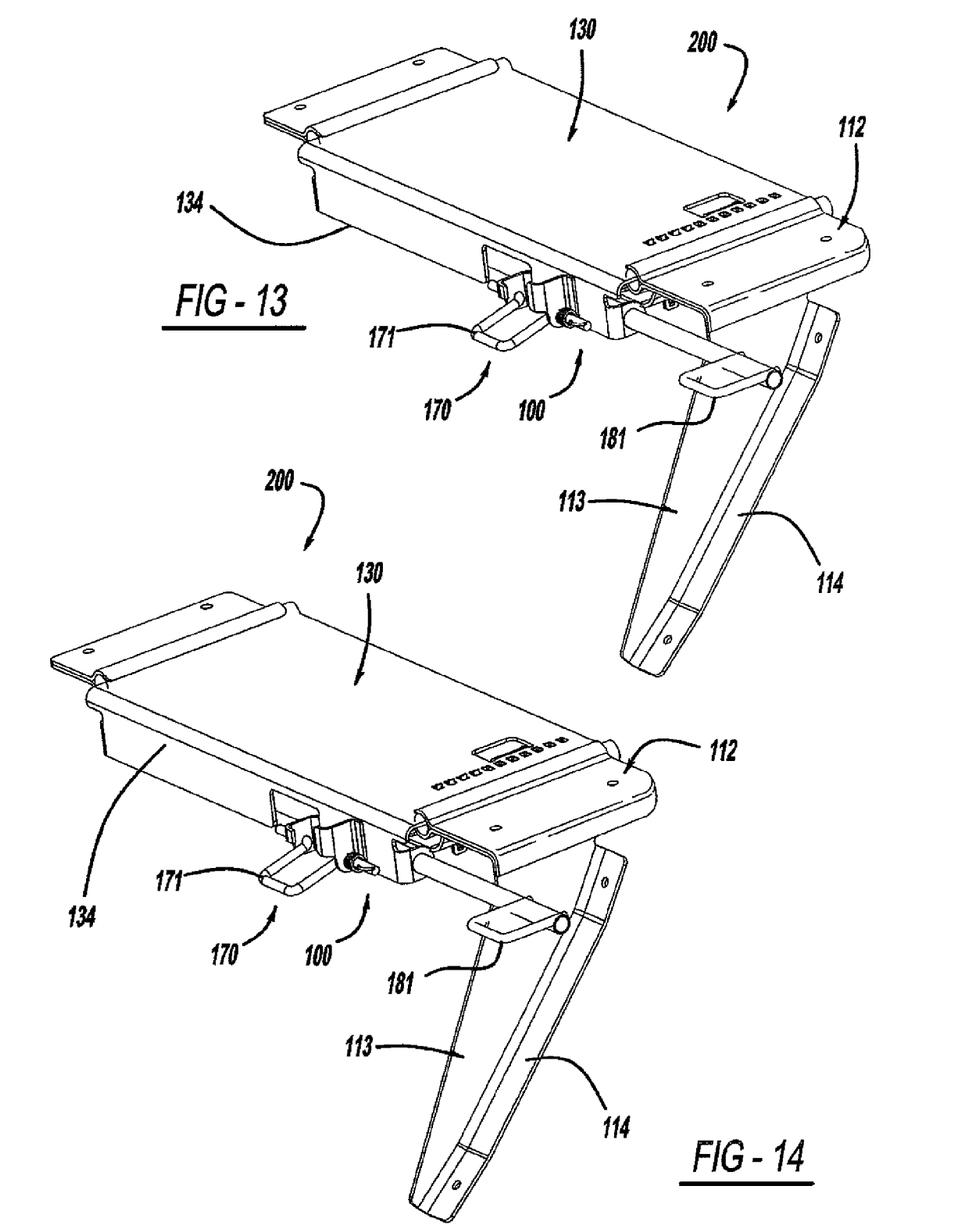
FIG. 13 is an isometric view of a vehicle seat recliner mechanism according to another exemplary embodiment.
FIG. 14 is another isometric view of the vehicle seat recliner mechanism of FIG. 13.
Figure 15:
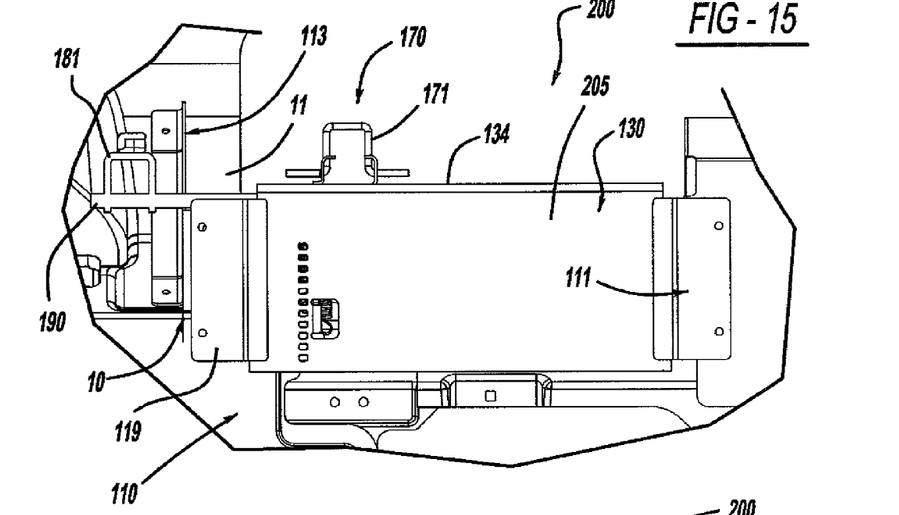
FIG. 15 is a top elevation view of a closeout device according to an exemplary embodiment shown in a retracted position.
Figure 16:
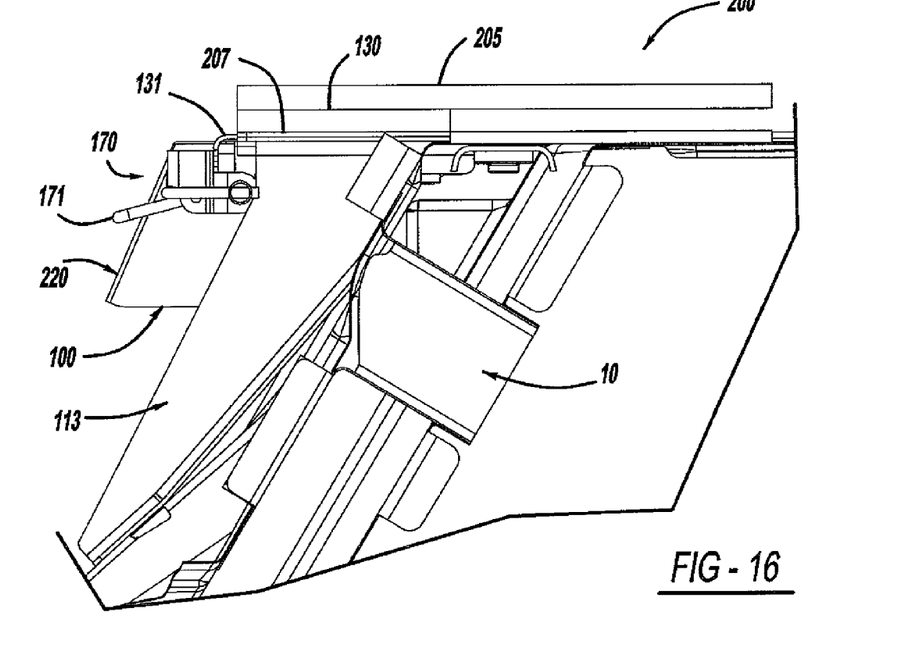
FIG. 16 is a side elevation view of the closeout device of FIG. 15 shown in the retracted position.
Figure 17:
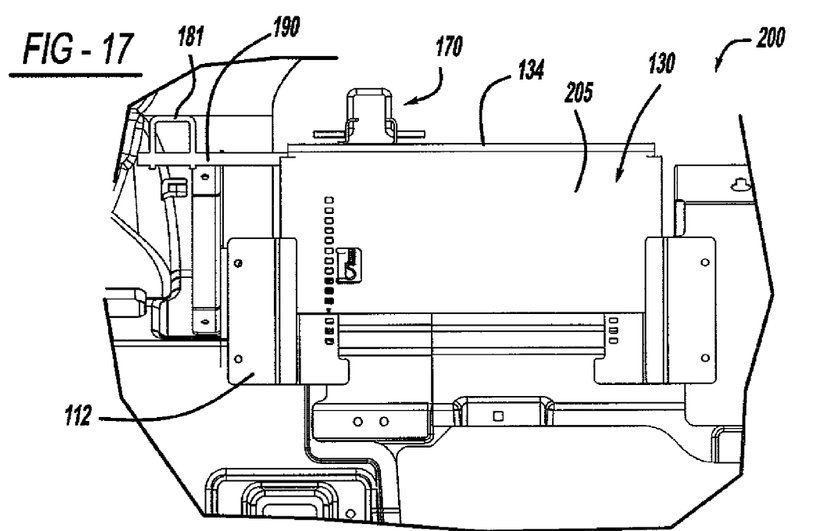
FIG. 17 is a top elevation view of the closeout device of FIG. 15 shown in an extended position.
Figure 18:
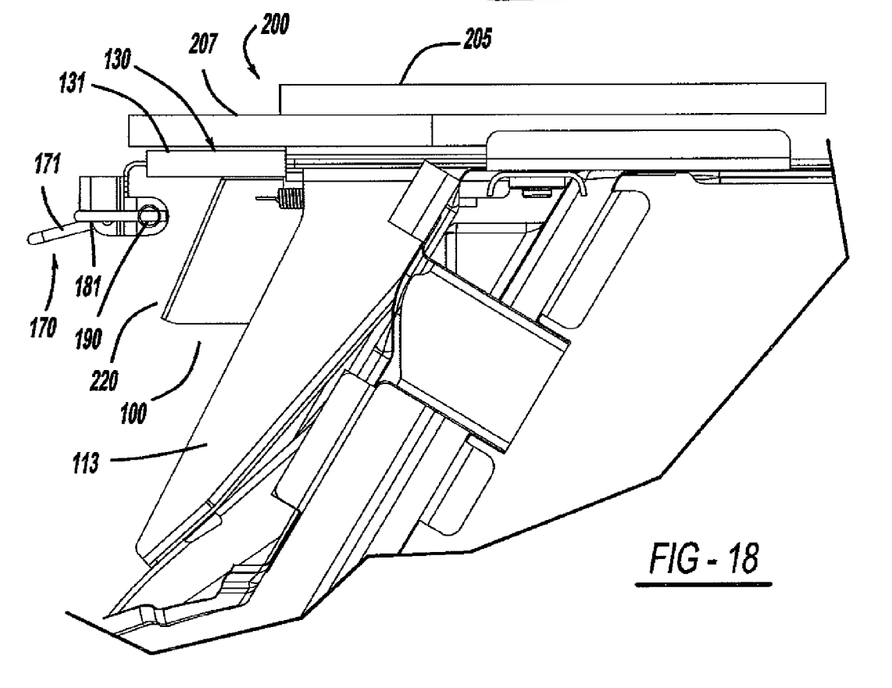
FIG. 18 is a side elevation view of the closeout device of FIG. 15 shown in the extended position.
Figure 19:
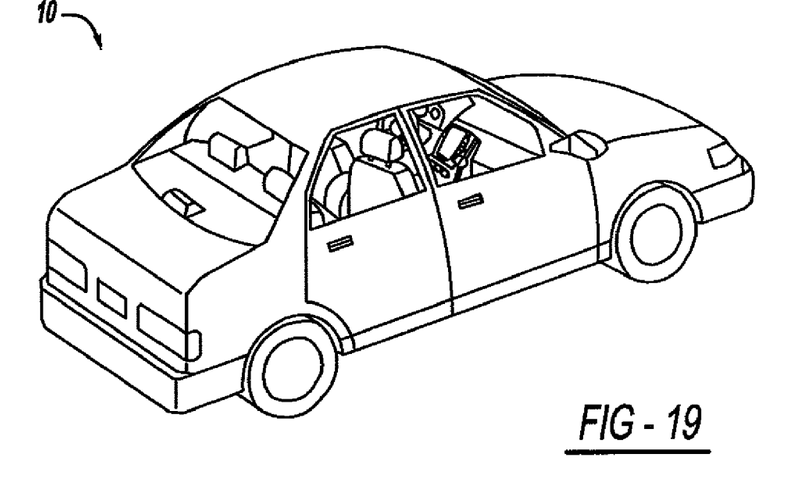
FIG. 19 is a perspective elevation view of a vehicle having a recliner mechanism and closeout device according to the present disclosure.
Figure 20:
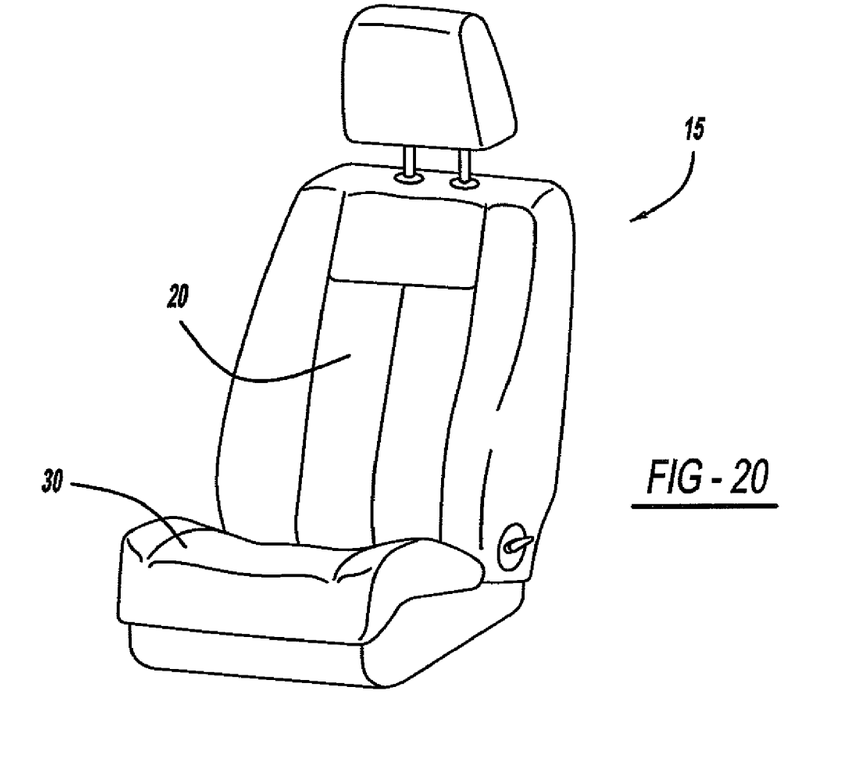
FIG. 20 is a perspective view of a vehicle seat for use in a vehicle having a recliner mechanism and closeout device according to the present disclosure.

Referring now to FIGS. 13 and 14, a recliner mechanism 100 is shown according to another exemplary embodiment. As illustrated, the latch system 150 is provided on the inboard side of the vehicle seat 15 rather than on the outboard side as shown in FIGS. 1 through 12 and 15 through 18. Further the cross plate 130 is shown as having a configuration wherein the first striker 71 is supported on a bottom surface of the upper platform 205 rather than the flange 134 provided along the front edge 135 of the cross plate 130. Further still, the upper track member 119 of the outboard track arrangement 112 is shown as a flange portion that curves downward along the side of the mounting bracket 113.

The construction and arrangement of the elements of the recliner mechanism, including the closeout device, as shown in the illustrated and other exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited herein. For example, while the closeout device described herein (i.e., the telescoping shelf system) is shown as being used in combination with a linear recliner mechanism. The closeout device may also be suitable for use with a arc-shaped recliner mechanism (i.e., a recliner mechanism wherein a drive portion moves in the path of an arc). For an arc-shaped recliner mechanism, the guide channels may define arc-shaped path for the cross member. In such an embodiment, this arc shape path may take up the rotational travel of the seat back such that the first striker can remain fixed. Further, elements shown as integrally formed may be constructed of multiple parts or elements, the position of elements may be reversed or otherwise varied, and the nature or number of discrete elements or positions may be altered or varied. It should be noted that the elements and/or assemblies of the recliner mechanism may be constructed from any of a wide variety of materials that provide sufficient strength or durability in any of a wide variety of colors, combinations and suitable materials. Other substitutions, modifications, changes and omissions may be made in the design, operating conditions and arrangement of the preferred and other exemplary embodiments without departing from the scope of the present disclosure.

What is claimed is:

1. A recliner mechanism package shelf device for use in adjusting the position of a seat back of a vehicle seat in a vehicle, the recliner mechanism package shelf comprising:
   a cross member for use as a package shelf in a vehicle, the cross member adapted to be connected to the seat back proximate an upper end of the seat back;
   a track system connected with the cross member for moving the cross member in coordination with the movement of the seat back;
   a latch system connected with the cross member for selectively allowing movement of the cross member within the track system; and
   a bracket member having a first flange for connecting the bracket member to the vehicle and a second flange for supporting the cross member; wherein the track system comprises an inboard track arrangement and an outboard track arrangement, the outboard track arrangement having a first flange connected to and supported by the second flange of the bracket member; and wherein the cross member is a cross plate that is a substantially flat member that spans in a lateral direction between the outboard track arrangement and the inboard track arrangement.

2. The recliner mechanism package shelf of claim 1 wherein the cross member is a generally flat plate member.

3. The recliner mechanism package shelf of claim 1 wherein the cross member is a plate member having a plurality of holes for connection with the latch system to provide adjustment of the seat back.

4. The recliner mechanism package shelf of claim 1 wherein the cross member is a plate member and the recliner mechanism further comprises a cross tube connected to the plate member and extending laterally there from, the tube having a first striker member for connection to the seat back and a second striker member for connection to a side bolster.

5. The recliner mechanism package shelf of claim 1 wherein the cross member further comprises a closeout device including a telescoping shelf system connected with the cross member to telescope along with movement of the seat back.

6. The recliner mechanism package shelf of claim 5 wherein the cross member is a generally flat plate member.

7. The recliner mechanism package shelf of claim 5 wherein the telescoping shelf system includes a first upper member and a second lower member connected to the cross member.

8. A recliner mechanism for use in adjusting the position of a seat back of a vehicle seat in a vehicle, the recliner mechanism comprising:
   a cross member for use as a package shelf in a vehicle, the cross member adapted to be connected to the seat back proximate an upper end of the seat back;
   a track system connected with the cross member for moving the cross member in coordination with the movement of the seat back;
   a latch system connected with the cross member for selectively allowing movement of the cross member;
   a bracket having a first flange for connecting the bracket member to the vehicle and a second flange for supporting the cross member; wherein the track system comprises an inboard track arrangement and an outboard track arrangement, the outboard track arrangement having a first flange connected to and supported by the second flange of the bracket member; and wherein the cross member is a cross plate that is a substantially flat member that spans in a lateral direction between the outboard track arrangement and the inboard track arrangement; and
   a closeout device for covering a gap behind the seat back when it is moved from the reclined position.

9. The recliner mechanism of claim 8 wherein the closeout device comprises a. telescoping shelf system having a first upper member and a second lower member connected to the cross member.

10. The recliner mechanism of claim 8 wherein the cross member is a plate member and the recliner mechanism further comprises a cross tube connected to the plate member and extending laterally there from, the tube having a first striker member for connection to the seat back and a second striker member for connection to a side bolster.

11. The recliner mechanism of claim 8 further comprising an expansion component for closing out a side of the vehicle seat to prevent a gap from being created when the vehicle seat back is moved from the reclined position.

12. The recliner mechanism of claim 10 wherein the first striker has a pivot axis and the first striker rotates as the vehicle seat back is moved between recline positions.

* * * * *